United States Patent
Duineveld et al.

(10) Patent No.: US 7,823,562 B2
(45) Date of Patent: Nov. 2, 2010

(54) ENGINE FUEL CONTROL SYSTEM

(75) Inventors: John Duineveld, IJmuiden (NL); Erik T. Splint, Baarn (NL); Geoffrey V. Hemsley, Fort Collins, CO (US); Tim Holdeman, Loveland, CO (US)

(73) Assignee: Woodward Governor Company, Fort Collins, CO (US)

( * ) Notice: Subject to any disclaimer, the term of this patent is extended or adjusted under 35 U.S.C. 154(b) by 40 days.

(21) Appl. No.: 12/122,149

(22) Filed: May 16, 2008

(65) Prior Publication Data

US 2009/0287391 A1    Nov. 19, 2009

(51) Int. Cl.
*F02M 21/00*    (2006.01)
*F02B 7/00*    (2006.01)

(52) U.S. Cl. ............ 123/431; 123/1 A; 123/525; 123/198 A; 123/575

(58) Field of Classification Search ............ 123/1 A, 123/27 GE, 525, 527, 431, 575, 198 A
See application file for complete search history.

(56) References Cited

U.S. PATENT DOCUMENTS

| | | | |
|---|---|---|---|
| 4,011,840 A | | 3/1977 | Forster |
| 4,646,691 A | | 3/1987 | Kiyota et al. |
| 5,038,971 A | * | 8/1991 | Gayer et al. ............ 222/1 |
| 5,388,607 A | | 2/1995 | Ramaker et al. |
| 5,657,732 A | | 8/1997 | Wolters et al. |
| 6,805,107 B2 | | 10/2004 | Vinyard |
| 6,843,208 B2 | * | 1/2005 | Tamura et al. ............ 123/27 R |
| 6,990,956 B2 | * | 1/2006 | Niimi ............ 123/406.47 |
| 7,305,939 B2 | * | 12/2007 | Carlson ............ 123/27 GE |
| 7,357,101 B2 | * | 4/2008 | Boyarski ............ 123/1 A |
| 7,389,751 B2 | * | 6/2008 | Leone ............ 123/1 A |
| 7,404,380 B2 | * | 7/2008 | Hashimoto et al. ............ 123/1 A |
| 7,406,947 B2 | * | 8/2008 | Lewis et al. ............ 123/478 |
| 7,412,966 B2 | * | 8/2008 | Lewis et al. ............ 123/431 |
| 7,621,257 B1 | * | 11/2009 | Leone et al. ............ 123/431 |
| 2008/0098985 A1 | * | 5/2008 | Kamio ............ 123/304 |
| 2009/0271090 A1 | * | 10/2009 | Surnilla et al. ............ 701/103 |

FOREIGN PATENT DOCUMENTS

| | | |
|---|---|---|
| EP | 0 727 574 A1 | 8/1996 |
| JP | 2003-129913 * | 5/2003 |
| JP | 2007-315357 * | 12/2007 |
| JP | 2007-315358 * | 12/2007 |
| KR | 1991-0002232 Y1 | 4/1991 |
| WO | WO 2005/103464 A1 | 11/2005 |
| WO | WO 2005/103467 A1 | 11/2005 |

* cited by examiner

*Primary Examiner*—Hai H Huynh
(74) *Attorney, Agent, or Firm*—Reinhart Boerner Van Deuren P.C.

(57) ABSTRACT

A fuel control system is provided. The fuel control system includes an electronic control system coupled to a pair of control valves for blending pipeline fuel with waste fuel at a blend ratio for controlling fuel flow to an internal combustion engine. The fuel control system can estimate energy content of the fuel mixture to compensate the blend ratio. The fuel control system can use engine operational parameters to compensate the blend ratio. Typically, the system will use the operational parameter of output power or exhaust emissions to compensate the blend ratio. Further, the fuel control system can prioritize variation from the blend ratio or variation from a desired power output when the blend ratio cannot generate the desired power output. The fuel control system can also be equipped with engine speed/load controls, misfire, ignition timing and knock detection capabilities.

20 Claims, 3 Drawing Sheets

ENGINE FUEL CONTROL SYSTEM

FIELD OF THE INVENTION

This invention generally relates to internal combustion engines and more particularly to engine control and even more particularly to fuel and ignition control systems for internal combustion engines.

BACKGROUND OF THE INVENTION

Emissions mandates relating to greenhouse gases as well as the opportunity for cost savings are motivating operators of processing plants (for example sewage digesters or garbage landfills) to install electrical power generating or cogeneration equipment that use methane-rich waste fuel produced by their plant processes.

Typically, the heat and electrical power produced by this equipment is used within the plant in support of the process. However, the composition and quantity of the fuel produced is not reliably stable over time. Hence, on occasions when the net energy available from the waste fuel is insufficient to fully support plant operation, these operators must choose between purchasing the needed additional electrical power, or switching their generator or cogeneration operation over to pipeline fuel.

Engine control systems exist today that are capable of adapting between two different fuels, i.e. running exclusively on either one fuel or the other (see for example EP0727574B1). Unfortunately, this prevents the system from utilizing the pipeline fuel to directly supplement the waste fuel by blending the pipeline fuel with the waste fuel.

Further, U.S. Pat. No. 6,805,107 teaches supplying a varying quality fuel as well as a constant quality fuel to an engine. However, the constant quality fuel is supplied from two separate outlets such that a constant flow is provided from one of the outlets as a base flow rate and an adjustable flow is provided from the second outlet. By providing the constant flow of constant quality fuel, the system of the '107 patent cannot allow a user to run the system entirely on varying quality fuel in the event that such fuel is of sufficient quality to power the system.

Another solution that has been attempted is using blending equipment external to the engine control system that endeavors to provide a constant fuel quality by blending pipeline fuel with the waste fuel. Reports on this type of system are that the performance and reliability have been very disappointing, in view of the high purchase cost.

The present invention relates to improved methods and apparatus over the state of the art.

BRIEF SUMMARY OF THE INVENTION

The present invention has several aspects that may be claimed and stand as patentable independently and individually or in combination with other aspects, including but not limited to the following aspects and embodiments.

Embodiments of the invention provide a fuel control system that provides a fuel blending capability that is integrated with the engine controls and that can control and deliver an infinite blend between the two gases (i.e. waste fuel and pipeline fuel) while maintaining engine power, exhaust emissions and engine safety margins, and that does not add an inordinate amount of additional hardware or cost. Further, embodiments of the invention will use feedback information from the engine to modulate or compensate the fuel mixture to experience these previous features.

In one embodiment, the invention provides a method of dynamically controlling the supply of fuel to an engine from a reliable fuel source and an unreliable fuel source comprising the steps of determining a desired external blend ratio of a fuel mixture of reliable fuel to unreliable fuel to be fed to the engine; and feeding fuel to the engine at an actual blend ratio of a fuel mixture of reliable fuel to unreliable fuel. The step of feeding includes the steps of controlling a flow of fuel from the reliable fuel source to the engine; and controlling a flow of fuel from the unreliable fuel source to the engine.

In one embodiment, the invention provides a method of dynamically controlling the supply of fuel to an engine from a reliable fuel source and an unreliable fuel source. The method comprises the steps of monitoring an operational characteristic of the engine; controlling a flow of fuel from the reliable fuel source between full flow and no flow to the engine in response to the monitored operational characteristic of the engine; and controlling a flow of fuel from the unreliable fuel source between full flow and no flow to the engine in response to the monitored operational characteristic of the engine.

In a further embodiment, the invention provides a dynamic engine control system for selectively supplying fuel from a variable composition fuel source and a constant composition fuel source to an engine. The system includes first and second fuel control valves and a control system. The control system is operably coupled to the first and second fuel control valves. The control system includes at least one engine performance sensor to sense at least one engine performance parameter. The control system is configured to adjust the flow through the first and second fuel control valves based on the sensed engine performance parameter.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
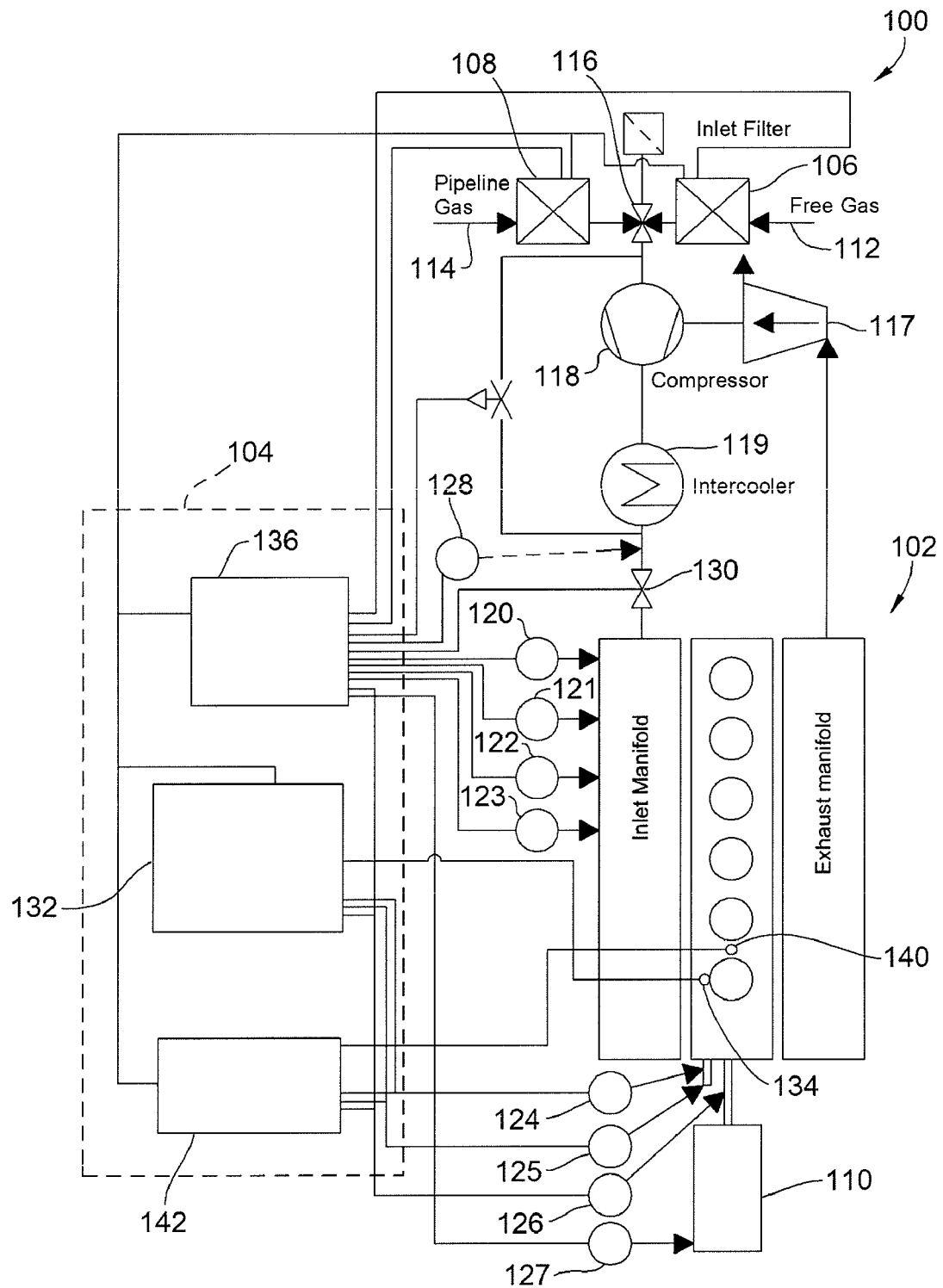
FIG. 1 is a simplified schematic diagram of an apparatus demonstrating a preferred embodiment of the present invention.

A power system 100 according to an embodiment of the present invention is illustrated schematically in FIG. 1 that can be powered by waste or alternative fuel generated at a local plant or fuel that is acquired from a third party. Waste fuel may also be referred to herein as "free fuel," "alternative fuel," "variable composition fuel" or "unreliable fuel" and is typically bio-derived fuel such as methane. The fuel acquired from a third party source may also be referred to as "reliable fuel," "stable fuel," "fixed composition fuel," "fixed quality"

or "pipeline fuel" and is typically fossil fuel such as liquid-petroleum or natural gas. However, the pipeline fuel could be bio-processed fuel that has been processed to a high quality standard. The power system 100 generally includes an internal combustion engine 102, an electronic control system 104, a pair of fuel control valves 106, 108 and a system load, which is typically an electrical generator 110. However, the power system 100 could be used to directly power other loads or machines rather than a generator.

The electronic control system 104 and control valves 106, 108 form a fuel control system that is a fuel-engine control system that can be used to independently control fuel flow to the engine 102 from two separate sources. One of the primary features of at least one embodiment of the fuel control system is to provide a means for fuel blending to control emissions or output power while utilizing waste fuels.

As illustrated, the fuel control system controls the flow of waste fuel (illustrated as arrow 112) and pipeline fuel (illustrated as arrow 114) to the internal combustion engine 102. Depending on characteristics of the waste fuel or waste fuel supply as well as operational parameters or characteristics of the internal combustion engine 102, the fuel control system can supply a fuel flow to the engine 102 that may be entirely waste fuel, entirely pipeline fuel or a blend or mixture of waste fuel and pipeline fuel. As the pipeline fuel is typically purchased form a third party supplier, it is preferred to run the engine 102 on as much, if not entirely on waste fuel 112 when possible.

Valve 106 is coupled to a supply of the waste fuel 112 and is operatively controlled by electronic controller 104 to control the volume of waste fuel flow to the internal combustion engine 102. Similarly, valve 108 is coupled to a supply of pipeline fuel 114 and is operatively controlled by electronic controller 104 to control the volume of pipeline fuel flow to the internal combustion engine 102. Valves 106, 108 are preferably intelligent valves that are electronically controlled such as TecJet or Raptor (hereinafter TecJet) valves currently available from Woodward Governor Company having a principle place of business in Fort Collins, Colo. Different fuel sources, i.e. pipeline fuel or waste fuel may use different TecJet valves. Further yet, different types of waste fuel from different locations such as a landfill as compared to a sewage treatment plant may also require different TecJet valves that are smart valves that are particularly configured for the individual fuel type.

These valves can communicate in two directions with the electronic control system 104 over a CAN communication link for rapid flow control adjustment. The use of the two direction communication link also allows for self-diagnostic information from digital actuators within the valves 106, 108 to be transmitted to the electronic controller 104. CAN communication used herein is typically CAN J1939 but could be other CAN communication links such as CAN Open external communications.

After passing through the respective valves 106, 108, the waste fuel 112 and pipeline fuel 114 are blended at blending apparatus 116. The blending apparatus may be a manifold or other structure coupling the fuel flows from valves 106, 108 as the fuel travels toward internal combustion engine 102. The blending apparatus may include a venturi structure to facilitate improved blending of the two fuel flows. However, the blending apparatus may merely be the coupling of the fuel pipes exiting the valves 106, 108. In the illustrated embodiment, if blending of the waste and pipeline fuel flows 112, 114 is to occur, it occurs prior to being aspirated. However, in alternative embodiments, each flow may have separate fuel-air mixing chambers prior to mixing of the waste fuel 112 and pipeline fuel 114. This alternative configuration allows each mixer to be sized and configured in accordance with the individual fuel properties and the aspiration of each fuel does not affect the aspiration of the other.

Further yet, while not necessary in all embodiments, the illustrated embodiment includes a turbo 117, a compressor 118 and intercooler 119 to assist in increasing engine power output. Optionally, turbocharger boost can also be controlled via turbine bypass or compressor bypass throttling, for optimized engine efficiency and surge protection.

The electronic control system 104 operably communicates with a plurality of sensors 120-128 for sensing various operational parameters (also referred to as "operational characteristics") of the generator system 100. Sensors 120-128 may include sensors for monitoring inlet manifold absolute mixture pressure, inlet manifold mixture temperature, engine speed, exhaust emissions, particulate trap pressure, engine coolant temperature, engine load, and engine knock. Also, the electronic control system 104 may operably communicate to sensors that monitor parameters regarding the waste fuel 112 and pipeline fuel 112, for example, fuel pressure, fuel temperature, fuel quality (which may also be calculated based on CH4%, CO2% or BTU value), fuel type or flow rate.

The fuel control system can also control the fuel flow to the engine 102 in relation to airflow, at any engine load and speed condition. As such, the electronic control system 104 of the illustrated embodiment is operably coupled to mixture throttle 130, i.e. a form of a choke. The mixture throttle 130 can adjust the amount of the air-fuel mixture entering the engine 102.

Ignition functionality is provided by the electronic control system 104. The electronic control system 104 includes a microprocessor-controlled ignition unit 132. The microprocessor-controlled ignition unit 132 is preferably a capacitive-discharge ignition system controller in the form of an IC-920 or IC-922 ignition module, which is coupled to capacitive discharge coils 134. The microprocessor-controlled ignition unit 132 functions as a slave to the electronic controller 136 of the electronic control system 104 over the CAN communication link. While it is preferred to us the IC-920 or IC-922 ignition modules, it is also possible to use other OEM ignition systems or ignition systems supplied with the engine. However, with other types of ignition systems, other types of coils beyond capacitive-discharge ignition can be used.

Knock detection and abatement can be provided by vibration sensing knock sensors 140 that are communicated back to a knock detection module 142 forming part of the electronic control system 104. Preferably, the knock detection module 142 is in the form of a FireFly Detonation Detection Control also currently available from the Woodward Governor Company. Again, the detonation detection module 142 communicates over a CAN communications link and the knock detection module will act as slave to the electronic controller 136 over the dedicated CAN link.

The fuel control system uses a timing set point that is fuel quality dependent, so that commanded global spark timing is compatible with the engine's requirement based on methane number.

Ignition retard commands for knock protection are received from the knock detection module 142 and acted upon. Ignition retard activity due to knock is monitored/controlled by the main electronic controller 136, which will act to reduce engine power in the event that maximum timing retard does not completely eliminate knock.

The fuel control system can control the speed or output of the engine as well as the exhaust emissions. Also, the fuel control system can control spark timing based on engine speed or spark energy based on misfire level. Global ignition timing calibration will be fuel specific.

The fuel control system can be applied to multi-bank, in-line and V-engines of any power output, naturally aspirated or turbo-charged. The fuel control system is easily configurable via PC and can cover a wide range of fuel compositions including for example wood gas to landfill fuel to LPG.

The system can run in a single fuel mode where a single type of fuel, i.e. pipeline or waste fuel is used, or in blended fuel mode. Running in single fuel mode, any fuel composition with sufficient BTU content and anti-knock characteristics for the particular engine is feasible. Running in blend mode, any blend between entirely variable composition waste fuel and entirely fixed composition pipeline fuel is also feasible. Whether in single fuel or blend mode, typical changes in waste fuel quality during normal operation of the engine are compensated by the fuel control system. It is desirable for the waste fuel to meet the criterion of being nominally a binary mixture of methane and inert fuel, between known endpoints. Furthermore, in blending mode, the more consistent the pipeline fuel quality (BTU content, Wobbe number and/or composition), the more effective the fuel control system can operate based on fuel blending algorithms. Increased consistency of the pipeline fuel improves the electronic control system 104, when necessary, to more accurately estimate the energy content of the fuel mixture that is being supplied to the engine 102.

The fuel blending operations of the fuel control system allows for independent control of fuel flow from two separate sources, while maintaining engine speed/load control, exhaust emissions, knock, and misfire margin, with no constraints on the blend ratio of the two fuels, as long as their respective supply pressures and properties remain within the engine application's calibrated limits. In the event that these parameters drift outside the calibrated limits, the fuel blending system can automatically adjust the blend ratio (i.e. the ratio of waste fuel to pipeline fuel) as necessary to maintain required power and continue protecting against knock and misfire. The fuel control system can gather operational characteristic feedback information from the internal combustion engine 102 such as inlet manifold pressure, exhaust emissions, output power and engine temperature to dynamically adjust the blend ratio. Typically, normal changes in blended fuel quality during fuel blending operation of the engine 102 are compensated by the fuel control system based on output power feedback.

Beyond operational characteristics of the internal combustion engine 102, the fuel control system can control the blend ratio based on characteristics of the waste fuel supply 112. In the event of significant departure of fuel pressure or fuel properties from normal ranges, the fuel control system effectuate further blending ratio changes. If necessary, the fuel control system can moderate engine power or even engine shutdown. Additionally, the fuel control system can provide accompanying alarm activity and diagnostic information.

The electronic control system 104 may be programmed to cover a wide range of fuel compositions from liquid petroleum gas (LPG) and natural gas to landfill gas and other low BTU fuels.

The fuel control system can be formed from the combination of a plurality of separate modules, as illustrated, or alternatively could be formed in a single electronic control device. Further yet, the functions described previously can also be part of an third party control system where the fuel system 104 communicates with this third party system by CAN communication.

Now that the primary structural features of the power system 100 have been introduced, the operation and features of the power system, and particularly the fuel control system, will be described.

Figure 2A:
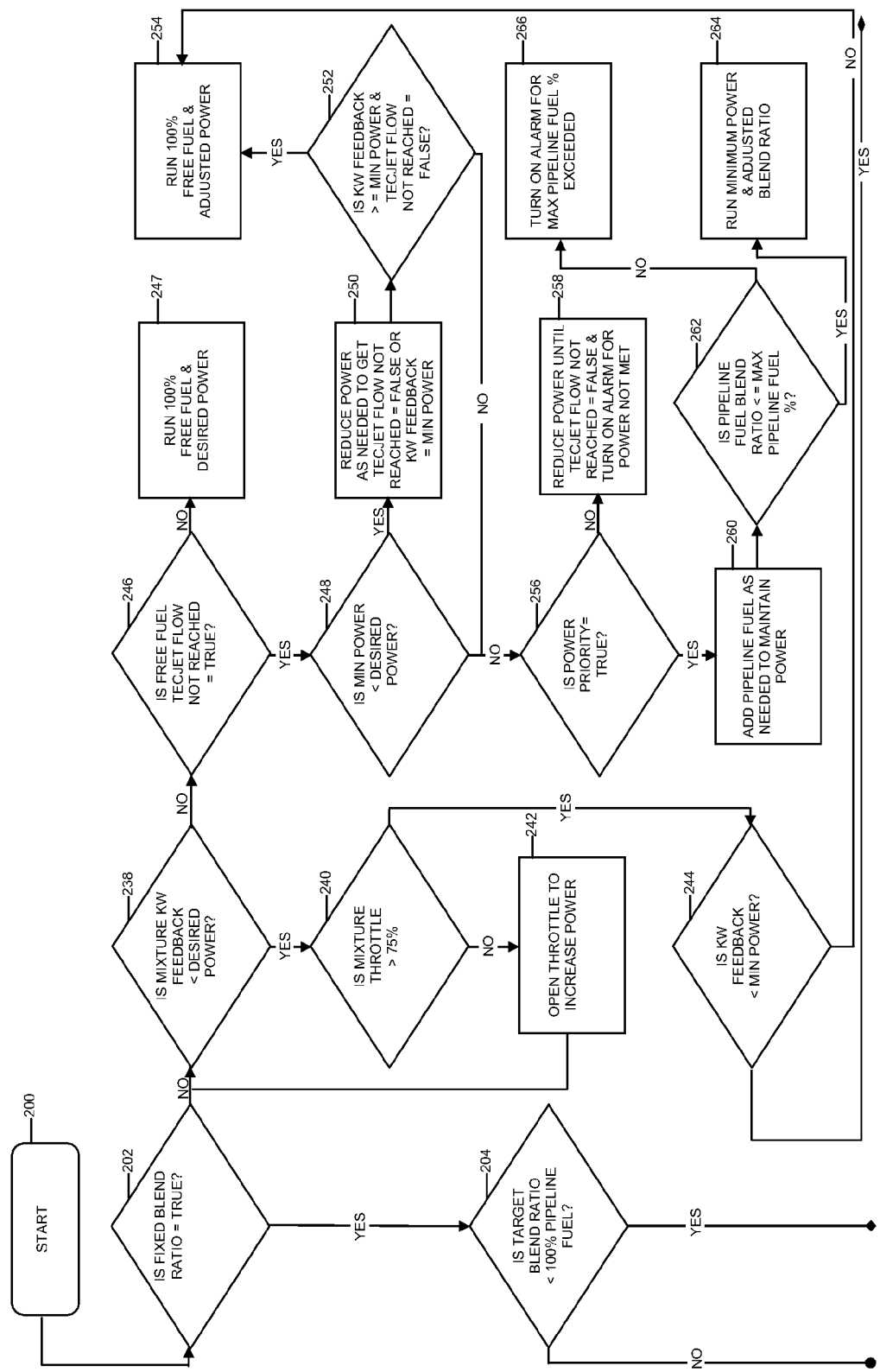
FIGS. 2A-B illustrate a flow chart illustrating control logic for controlling the fuel control system of the apparatus of FIG. 1.
Figure 2B:
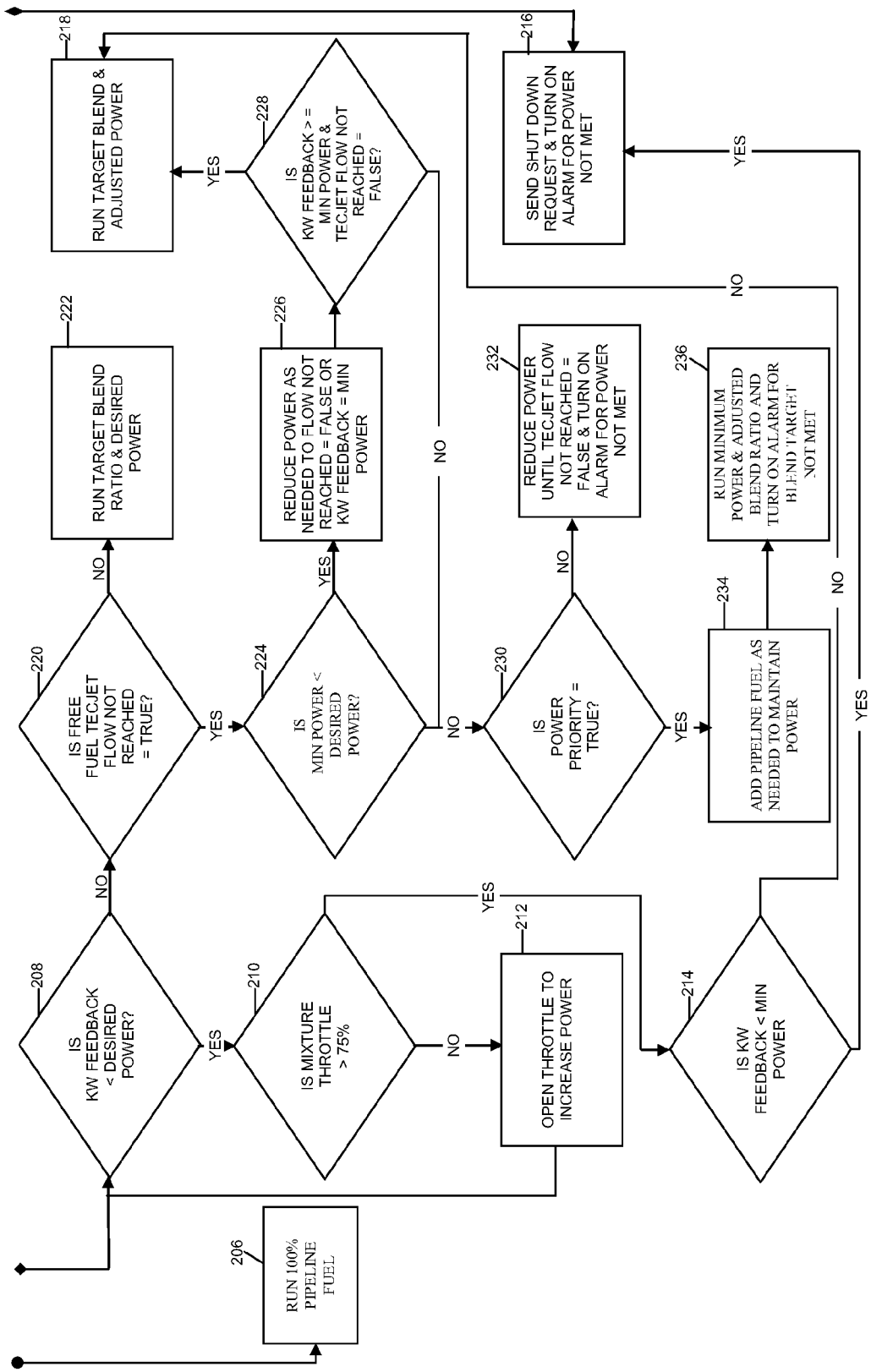

FIGS. 2A and 2B illustrate a flow chart generally illustrating potential control logic of the fuel control system based on various user specified quantities such as desired or external power output, desired or external blend ratio, maximum power output, minimum power output, minimum waste fuel usage (alternatively maximum pipeline fuel usage). These are just a few of the various parameters that may be externally determined by the operator.

In the ideal situation, the fuel control system runs at a blend ratio of 100% waste fuel without adding any pipeline fuel. However, when the operational parameters of the engine, such as knock, exhaust temperature, exhaust emissions, power output, inlet manifold pressure, etc. vary out of an acceptable predetermined range or the supply of waste fuel is insufficient to run the engine, the fuel control system will vary from this desired or external blend ratio to include pipeline fuel in the actual fuel mixture to form an actual blend ratio.

Normal operation of the fuel control system consists of following an externally commanded (i.e. desired) power target that is input by the end user, while consuming fuel from both or either of the waste fuel 112 or pipeline fuel 114 in accordance with input logic and information received from the plant producing the waste fuel. Typically, this input logic will be that the fuel control system is to operate in either minimum power output (i.e. the control system is to maintain the power output above the minimum power output) or minimum waste fuel usage (i.e. the control system is to maintain the waste fuel usage above the minimum waste fuel usage).

The actual blending of fuels may deviate from the input logic received, when necessary, due to operating conditions. The external blend ratio is a proportional value that can range from all pipeline fuel and no waste fuel to no pipeline fuel and all waste fuel, with all mixtures in-between. This is effected by using the dedicated valves 106, 108 for each fuel. Each valve 106, 108 is sized and programmed for a particular fuel BTU and available fuel pressure.

The fuel control system, and particularly electronic controller 136, determines the instantaneous mass flow required for each valve 106, 108, and commands these flows to the respective valves 106, 108. Each valve 106, 108, in turn, operates to deliver the commanded mass fuel flow.

In some embodiments, the fuel control system, and particularly electronic controller 136 of electronic control system 104, estimates the actual energy content of the fuel mixture that is fed to the engine 102. This energy content is used for ignition timing adjustment and/or load reduction, based on interpolation between 100% pipeline fuel and 100% waste fuel. This information is stored in a lookup table. The actual ignition timing from an ignition controller of the electronic controller 104 is used as an input for the total efficiency lookup table inside the electronic controller 104. This estimated energy content can also be used to compensate the actual blend ratio of the fuel being supplied to the engine 102.

The fuel control system continuously determines a final internal or actual blend ratio which is based on the input logic received from the plant or a programmed desired blend ratio (i.e. a blend ratio set point), such as, for example, a desired blend ratio of 100% waste fuel. Under normal conditions, the external or desired blend ratio is the same as the actual or internal blend ratio. However, conditions can occur to make it undesirable or impossible to realize the targeted external blend ratio. This is more likely when the targeted external blend ratio is 100% or a relatively high proportion of the waste fuel, and can be the result of:

Insufficient supply pressure for delivery of the desired BTU value of the waste fuel (this will cause the waste fuel valve 106 to generate a "flow not reached" alarm).

Monitored process pressure of the waste fuel is at or below the minimum threshold being externally commanded (this feature allows the plant to prevent the fuel blending activity from depleting the waste fuel and/or adversely affecting the plant waste fuel production process).

High exhaust temperature (attributed to adverse combustion characteristics of the waste fuel) being detected by the fuel control system (this feature is an optional feature).

Under these circumstances, the fraction of waste fuel 112 in the actual or internal blend ratio will be reduced within the constraints permitted by the input logic received from the plant to a value that allows operation in accordance with the plant input logic while maintaining critical engine and process parameters within normal range. If the blend constraints, external conditions and critical parameters are not compatible, a shutdown and alarm may be generated.

A desirable feature that the fuel control system offers the end user is the ability to configure the control to use a minimum amount of pipeline fuel or none at all, to the extent that waste fuel is available to meet the desired power output target. For example, if the user wants to only use waste fuel, the end user first sets the external or desired blend ratio to 100% waste fuel. Additionally, the user may specify a maximum permissible pipeline fuel usage rate (e.g. 10% by setting the blend ratio input to 90% waste fuel), in the event that 100% waste fuel is insufficient to supply the desired power.

The next step is to set a window for the desired power output that will allow the fuel control system to modulate power between an upper (preferred) target level and a lower (minimum acceptable) power level. In this configuration, the fuel control system will maintain the power at the upper targeted level using 100% waste fuel, waste fuel quality and availability permitting. As the waste fuel 112 is typically bio-generated at the local site, the quality or composition of the fuel can vary much more drastically than the pipeline fuel causing variation in the power-output that may be generated by using the waste fuel. Further, as the rate of production of waste fuel may vary from time-to-time, the plant may not be able to provide sufficient waste fuel or the end user may not want to use too much fuel so as to disrupt the waste fuel production process. Thus, the fuel control system may modulate power output to protect the waste fuel production process.

When upper targeted power cannot be met for one of these reasons, the fuel control system will automatically reduce load, thereby reducing waste fuel flow while maintaining blend ratio at 100%. In this situation, blend ratio has been prioritized over power out. However, in this mode, even though blend ratio was prioritized over power output, the fuel control system will not reduce power below the user specified minimum acceptable level. Instead, if necessary, pipeline fuel will be added to the waste fuel to maintain power at the user specified minimum level.

In this mode (i.e. when there is a difference between the user input target power and minimum acceptable power settings), power reduction down to the user specified lower limit will take precedence over reduction of blend ratio, whenever it is not possible to maintain target power and 100% (or target) blend ratio simultaneously. This mode is available with desired blend ratios below 100% waste fuel, although 100% waste fuel would normally be the user's preferred setting. In other words, as reduction in power output is the first thing that is modified, maintaining the blend ratio takes precedence or priority over maintaining a desired maximum power output.

Thus, this mode can be and is disabled whenever the user sets minimum acceptable or actual power output at or above the setting for desired power. It can also be permanently disabled if desired by adjusting the program settings or tying the upper and lower load inputs to the same value, typically by joining the two values to a single signal.

There is also a "power priority" discrete input. The purpose of this is to allow the user to indicate a preference, for the eventuality that the minimum power and maximum permissible pipeline fuel usage (i.e. predetermined minimum amount of waste fuel usage) cannot be met simultaneously. When the user chooses power priority=True (alternatively, waste fuel priority=False), power will be maintained by adding pipeline fuel above the indicated maximum permissible level, and an alarm will be activated indicating that this is taking place. When power priority=False (alternatively, waste fuel priority=True), the maximum permissible pipeline fuel limit will be observed, and power will be reduced below the minimum acceptable power input, with an alarm generated indicating that this is taking place. Alternatively, shutdown may be initiated accompanied by an alarm.

Now that a more general description of the structure and operating features of the fuel control system of the present invention has been provided, a more detailed description of the flow chart illustrated in FIGS. 2A and 2B illustrating one set of control logic implemented by the fuel control system to include these features will be detailed.

The fuel control system is activated at initial block 200. Once started, the fuel control system proceeds to decision block 202 to determine if a fixed blend ratio mode has been selected, such as by determining that the fixed blend ratio equals true. If it has been determined that the fixed blend ratio is true, it is next determined whether or not the target blend ratio is less than 100 percent pipeline fuel, as illustrated in decision block 204. If the control system has been programmed such that the blend ratio is not less than 100 percent pipeline fuel, the fuel control system will run on 100 percent pipeline fuel, as illustrated in process block 206. In this mode, the electronic control system 104 identified above will close valve 106 so as to prevent any fuel flow from the waste fuel 112 and open valve 108 controlling the pipeline fuel 114.

Returning to decision block 204, if the target blend ratio is less than 100 percent pipeline fuel, the fuel control system will proceed to determine if the actual or internal power output of engine 102 is less than the external desired power output, as illustrated in decision block 208. If the actual power output of the engine is less than the desired power output, then the fuel control system will determine whether the mixture throttle is greater than 75 percent, as illustrated in decision block 210. If the mixture throttle is not greater than 75 percent, then the fuel control system will proceed to open throttle to increase power, as illustrated in process block 212. After the throttle has been increased, this throttle analysis process is repeated by returning back to decision block 208 to determine if the power output of engine 108 is less than the desired power output. It should be noted that 75 percent is merely used for illustrative purposes. This limit may be user adjusted to higher or lower values in accordance with engine performance and fuel specifications.

Returning to decision block 210, if the mixture throttle is greater than 75 percent, the fuel control system will proceed to determine if the actual power output of engine 102 is less than a pre-defined desired minimum power output, as illustrated in decision block 214. If the actual power output of engine 102 is less than the pre-defined desired minimum power output, the fuel control system will send a shut-down request and turn on an alarm to indicate that the desired minimum power output is not being met, as illustrated in process block 216. Alternatively, if the actual power output of engine 102 is not less than a minimum desired power output (i.e. the actual power output is greater than a minimum desired power output), the fuel control system will proceed to run the target blend and adjusted power, as illustrated in process block 218. This adjusted power will be less than the desired power output; however, it will be above the predetermined minimum desired power output.

Returning to decision block 208, if the actual power output of engine 102 is not less than the desired power output (i.e. the engine is operating at or above a desired power level), the fuel control system will proceed to determine if the desired target blend ratio between the waste fuel 112 and pipeline fuel 114 is reached, as illustrated in decision block 220. If the desired blend ratio is reached, which is illustrated in the flow chart as the desired flow of waste fuel 112 not reached equals being false, the fuel control system will run the desired target blend ratio and the desired power output, as illustrated in process block 222. This is the desired operating condition when the fuel control system is under the primary mode of running in a fixed blend ratio mode as originally determined in decision block 202. Preferably, this desired target blend ratio will be 100 percent waste fuel 112.

Alternatively, if the fuel control system determines that the desired blend ratio is not reached, which is illustrated as the waste fuel flow not reached equals true in decision block 220, the fuel control program will proceed to determine if the predefined desired minimum power output is less than the predefined desired power output, as illustrated in decision block 224. This decision step is used to determine whether the user has overridden any use of a predetermined desired power range as described previously. If the desired minimum power output is less than the desired power output, which indicates that the user has approved a predetermined acceptable power output range below the desired power output, the fuel control system will proceed to reduce power as needed until either the desired blend ratio is reached or the actual power output of engine 102 is equal to the desired minimum power output, as illustrated in process block 226. Once one of these two conditions has been met, the fuel control system will determine if the actual power output is greater than or equal to the desired minimum power and if the desired minimum amount of waste fuel is being used in the actual blend ratio (i.e. the target blend ratio has been met), as illustrated in decision block 228. If these conditions are reached, the fuel control system will proceed to run the desired target blend ratio and the adjusted power that is greater than or equal to the predetermined minimum power, as illustrated in process block 218.

Alternatively, if the conditions are not met in decision block 228 or the minimum desired power output of engine 102 is set to a higher power than the desired power output, which is determined in decision block 224, the fuel control system will proceed to determine if the user has set the fuel control program to operate under a power priority mode, which is illustrated as power priority equals true in decision block 230, or a blend ratio priority mode, which would be power priority equals false. If the power priority is not true (i.e. the user has set the fuel control system into a blend ratio priority mode), the fuel control system will proceed to reduce the actual power output of engine 102 until the desired blend ratio has been reached and it will activate an alarm to indicate to the operator that the desired power has not been met, as illustrated in process block 232.

Alternatively, if power priority has been set to true (i.e. the user has determined that first attempting to maintain engine output power is more important than maintaining a desired blend ratio), the fuel control system will proceed to add additional pipeline fuel so as to maintain the actual output power of engine 102 above or equal to the minimum desired power output, as illustrated in process block 234, and the fuel control system will proceed to run the engine 102 at a minimum desired power and the adjusted blend ratio.

However, as the target blend ratio has not been met as was originally determined to be the mode that the program was to run in as determined in decision block 202, the fuel control system will turn on an alarm to indicate to the user that the desired target blend ratio has not been met, as illustrated in process block 236.

Returning to decision block 202, if the user has programmed the fuel control system so as to run in a power output mode, which is illustrated by the fixed blend ratio equaling false in decision block 202, the fuel control system will proceed to determine if the engine 102 is providing an actual power output that is less than an external or desired power output, as illustrated in decision block 238.

If the actual power output of the engine is less than the desired power output, the fuel control system will determine whether the mixture throttle is greater than 75 percent, as illustrated in decision block 240. If the mixture throttle is not greater than 75 percent, then the fuel control system will proceed to open throttle to increase power, as illustrated in process block 242. After the throttle has been increased, this throttle analysis process is repeated by returning back to decision block 238 to determine if the power output of engine 108 is less than the desired power output.

Returning to decision block 240, if the mixture throttle is greater than 75 percent, the fuel control system will proceed to determine if the actual power output of engine 102 is less than a pre-defined desired minimum power output, as illustrated in decision block 214. If the actual power output of engine 102 is less than the pre-defined desired minimum power output, the fuel control system will send a shut-down request and turn on an alarm to indicate that the desired minimum power output is not being met, as illustrated in process block 216.

Alternatively, if the actual power output of engine 102 is not less than a minimum desired power output (i.e. the actual power output is greater than a minimum desired power output), the fuel control system will proceed to run 100 percent free fuel and the adjusted power, as illustrated in process block 254. This adjusted power will be less than the desired power output; however, it will be above the predetermined minimum desired power output. Further, as the initial blend ratio is typically set at 100 percent waste fuel in the power mode, which is determined at decision block 202, the blend ratio will be 100 percent waste fuel as there was no step for adjusting the actual blend ratio.

Returning to decision block 238, if the actual power output of engine 102 is not less than the desired power output (i.e. the engine is operating at or above a desired power level), the fuel control system will proceed to determine if the desired target blend ratio between the waste fuel 112 and pipeline fuel 114 is reached, as illustrated in decision block 246.

Unlike in the configuration where the fuel control system operates in the fixed blend ratio mode, when the fuel control system operates in the power output mode, if the desired power output is met at decision block 238, if in decision block 246 it is determined that the desired waste fuel flow is reached, the fuel control system will run at 100 percent waste fuel and the desired power output, as illustrated in process block 247. This operation on 100 percent waste fuel occurs because the fuel control system is initially programmed to initially operate on 100 percent waste fuel when in the power output mode, determined at decision block 202.

Alternatively, if the desired blend ratio of 100 percent is not reached in decision block 246, the fuel control system will proceed to determine if the user has set the desired minimum power output less than the desired power, as illustrated in decision block 248. If the minimum power has been set less than the desired power, such that a predetermined power output range has been input, the fuel control system will reduce power as needed until either the desired blend ratio has been reached or the actual power output of engine 102 is equal to the pre-defined minimum power output, as illustrated in process block 250. Once this has occurred, the fuel control system will proceed to determine if the actual power output is greater than or equal to the desired minimum power output and the desired blend ratio has been met, as illustrated in decision block 252. If these requirements have been met, the fuel control system will operate by running at 100 percent waste fuel and at the adjusted power, as illustrated in process block 254.

Alternatively, if these requirements are not met in decision block 252 or the minimum power is set to be greater than the desired power in decision block 248, the fuel control program will proceed to determine if the user has prioritized maintaining power output over maintaining the desired blend ratio, as illustrated in decision block 256. If the user has prioritized blend ratio over power output (i.e. power priority equals false or power priority does not equal true), the fuel control program will proceed to reduce power output until the desired blend ratio is met and turn on an alarm to indicated that the desired power has not been met, as illustrated in process block 258.

Alternatively, if the user has prioritized maintain power output over maintaining blend ratio at decision block 256, the fuel control system will add pipeline fuel as needed to maintain power, as illustrated in process block 260. The fuel control system will then proceed to determine if the actual blend ratio includes more than a maximum allowable amount of pipeline fuel, as illustrated in decision block 262. If the amount of pipeline fuel in the actual blend ratio is less than or equal to the maximum allowable amount of pipeline fuel, the fuel control system will proceed to operate at the minimum allowable power output and at the adjusted blend ratio, as illustrated in process block 264. Alternatively, if the amount of pipeline fuel needed in the blend ratio to maintain minimum power output is greater than the maximum amount of allowable pipeline fuel, the fuel control system will turn on an alarm to indicate that the amount of pipeline fuel has been exceeded, as illustrated in process block 266. However, as power output has been prioritized, the fact that the blend ratio has fallen out of an acceptable range, will not cause the fuel control system to shut down engine 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of dynamically controlling the supply of fuel to an engine from a reliable fuel source and an unreliable fuel source comprising the steps of:
   determining a desired external blend ratio of a fuel mixture of reliable fuel to unreliable fuel to be fed to the engine; and
   feeding fuel to the engine at an actual blend ratio of a fuel mixture of reliable fuel to unreliable fuel by:
      controlling a flow of fuel from the reliable fuel source to the engine; and
      controlling a flow of fuel from the unreliable fuel source to the engine.

2. The method of claim 1, wherein the external blend ratio and actual blend ratio are initially the same;
   further comprising the steps of:
      sensing an operational parameter of the engine;
      maintaining the actual blend ratio as the external blend ratio when the sensed operational parameter of the engine is within a predetermined acceptable range; and
      compensating the actual blend ratio from the external blend ratio when the sensed operational parameter of the engine is outside a predetermined acceptable range.

3. The method of claim 2, wherein the operational characteristic of the engine is power output of the engine and the step of compensating the actual blend ratio includes increasing the amount of reliable fuel in the blend ratio when the power output of the engine falls below a minimum acceptable power output.

4. The method of claim 2, wherein the operational parameter is the exhaust emissions of the engine.

5. The method of claim 1, further comprising the step of estimating an energy content of the fuel mixture and further comprising the step of compensating the actual blend ratio based on the estimated energy content.

6. The method of claim 5, further comprising sensing an operational parameter of the engine and further comprising the step of compensating the estimated energy content of the fuel mixture based on the sensed operational parameter of the engine.

7. The method of claim 1, further comprising the steps of determining a desired external engine power output;
monitoring an actual engine power output; and
prioritizing actual engine power output and the actual blend ratio such that when actual engine power output is prioritized over actual blend ratio, actual blend ratio is first compensated to adjust actual engine power output toward the external engine power output, and when actual blend ratio is prioritized over actual engine power output, actual engine power output is first compensated to adjust actual blend ratio toward the external blend ratio.

8. The method of claim 7, further comprising determining a maximum reliable fuel blend ratio and compensating actual blend ratio when the monitored actual engine power output drops below a minimum predetermined acceptable power output.

9. A method of dynamically controlling the supply of fuel to an engine from a reliable fuel source and an unreliable fuel source comprising the steps of:
monitoring an operational characteristic of the engine;
controlling a flow of fuel from the reliable fuel source between full flow and no flow to the engine in response to the monitored operational characteristic of the engine; and
controlling a flow of fuel from the unreliable fuel source between full flow and no flow to the engine in response to the monitored operational characteristic of the engine.

10. The method of claim 9, wherein further including the steps of blending the flow fuel from the reliable fuel source with the flow of fuel from the unreliable fuel source to form a fuel mixture having a fuel blend ratio and wherein the steps of controlling the flow fuel from the reliable and unreliable fuel source include controlling the flow of fuel from the reliable and unreliable fuel sources such that the fuel blend ratio is a user desired blend ratio.

11. The method of claim 10, wherein controlling the flow of fuel from the reliable fuel source and controlling the flow of fuel from the unreliable fuel source to adjust the blend ratio based on the monitored operational characteristic of the engine.

12. The method of claim 10, wherein the step of monitoring an operational characteristic of the engine includes monitoring power output and the method further comprising the steps of:
estimating the energy content of the fuel mixture; and
compensating changes in the fuel blend ratio based on the monitored power output.

13. The method of claim 9, further comprising the steps of:
monitoring a supply characteristic of the unreliable fuel source; and
controlling the flow of fuel from the reliable fuel source in response to the monitored supply characteristic of the unreliable fuel source.

14. The method of claim 9, wherein the step of monitoring an operational characteristic of the engine includes monitoring at least one of the operational characteristics selected from the group consisting of engine knock, engine misfire, exhaust emissions, engine output speed, manifold pressure, manifold temperature, and engine output power.

15. The method of claim 9, further including the steps of blending the flow fuel from the reliable fuel source with the flow of fuel from the unreliable fuel source to form a fuel mixture having a fuel blend ratio of reliable fuel to unreliable fuel, wherein the ratio is variable between entirely reliable fuel and entirely unreliable fuel.

16. A dynamic engine control system for selectively supplying fuel from a variable composition fuel source and a fixed composition fuel source to an engine, the system comprising:
a first fuel control valve coupled to the variable composition fuel source and a second fuel control valve coupled to the fixed composition fuel source; and
a control system operably coupled to the first and second fuel control valves, the control system including at least one engine performance sensor to sense at least one engine performance parameter, the control system configured to adjust the flow through the first and second fuel control valves based on the sensed engine performance parameter.

17. The system of claim 16, wherein the at least one engine performance parameter is engine power output and the control system is configured to operate in a power output mode in which the control system will modulate a blend ratio of a mixture of fuel from the first and second fuel control valves to maintain the sensed engine power output within a desired range.

18. The system of claim 17, wherein the control system is configured to activate an alarm when a ratio of fixed composition fuel to variable composition fuel exceeds a maximum limit.

19. The system of claim 16, wherein the control system is configured to operate in a blend ratio priority mode in which a desired blend ratio between the flow of fuel from the first and second fuel control valves is maintained and engine power output is modulated to maintain.

20. The system of claim 19, wherein the control system is further configured to include a minimum engine power output, wherein the control system controls the flow through the first and second fuel control valves such that the output power of the engine remains above the minimum engine power output.

* * * * *